United States Patent
Yao

(10) Patent No.: US 8,563,635 B2
(45) Date of Patent: Oct. 22, 2013

(54) RESIN COMPOSITION AND RESIN MOLDED ARTICLE

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 45 days.

(21) Appl. No.: 13/439,519

(22) Filed: Apr. 4, 2012

(65) Prior Publication Data

US 2013/0096243 A1   Apr. 18, 2013

(30) Foreign Application Priority Data

Oct. 12, 2011   (JP) ................................ 2011-225044

(51) Int. Cl.
   *C08K 5/15*   (2006.01)

(52) U.S. Cl.
   USPC ............................ 524/114; 524/100; 524/504

(58) Field of Classification Search
   USPC .......................................... 524/100, 114, 504
   See application file for complete search history.

(56) References Cited

U.S. PATENT DOCUMENTS

2005/0137332 A1   6/2005   Hale et al.
2005/0137356 A1   6/2005   Hale et al.

FOREIGN PATENT DOCUMENTS

JP   A-2007-515543   6/2007

*Primary Examiner* — Terressa Boykin
(74) *Attorney, Agent, or Firm* — Oliff & Berridge, PLC

(57) ABSTRACT

A resin composition contains (A) a polylactic acid, (B) a polyhydroxyalkanoate, (C) an ammonium polyphosphate, and (D) a phenol-modified epoxy compound. With respect to the total amount of the resin composition, the polylactic acid (A) and the polyhydroxyalkanoate (B) are contained from about 60% by mass to about 95% by mass; the ammonium polyphosphate (C) is contained from about 4% by mass to about 35% by mass; the phenol-modified epoxy compound (D) is contained from about 1% by mass to about 5% by mass; the polylactic acid (A) is contained from about 40% by mass to about 90% by mass; the polyhydroxyalkanoate (B) is contained from about 5% by mass to about 55% by mass; and the amount ratio of the polylactic acid (A) to the polyhydroxyalkanoate (B) is from about 0.7 to about 18.

16 Claims, 1 Drawing Sheet

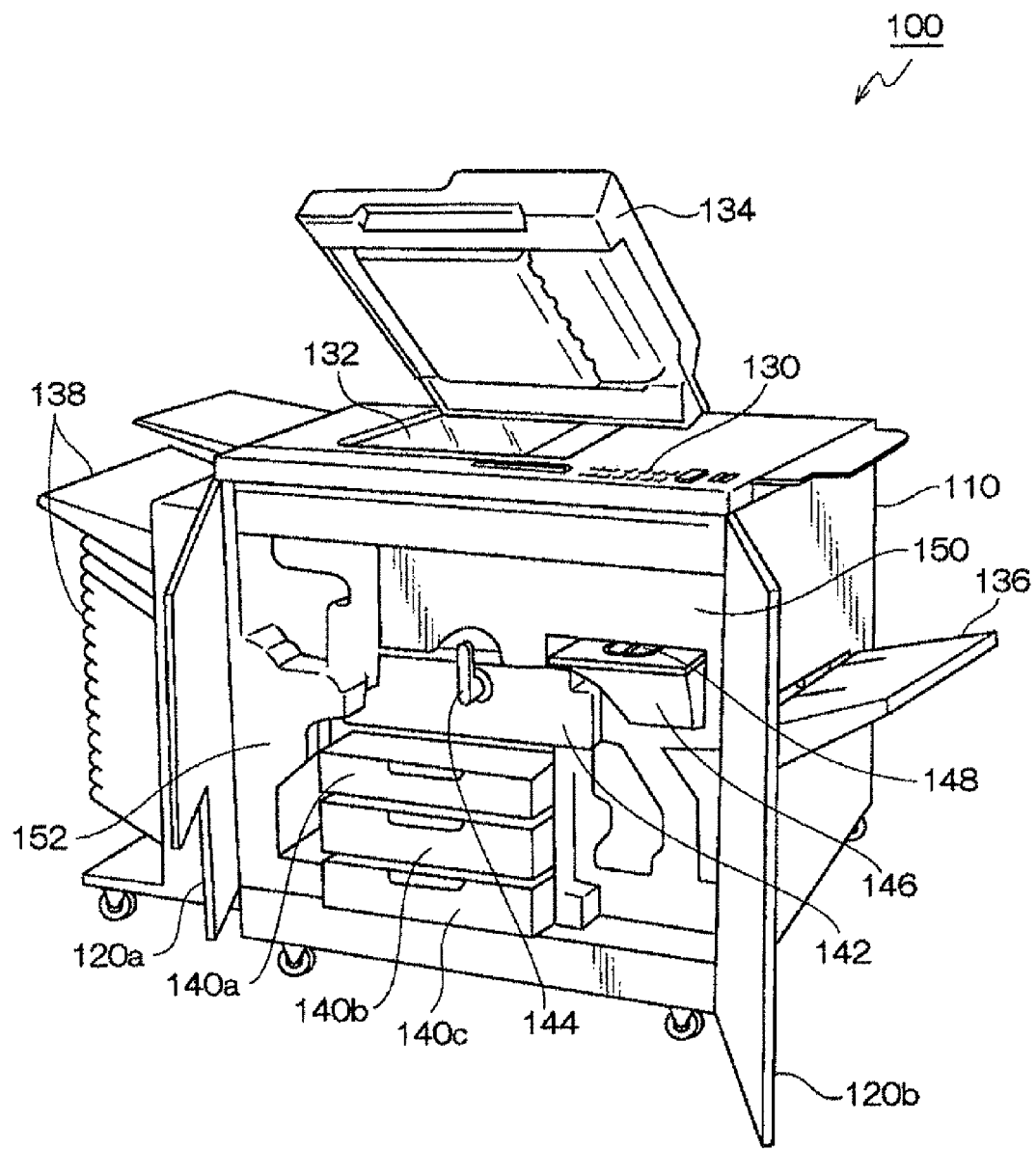

RESIN COMPOSITION AND RESIN MOLDED ARTICLE

CROSS-REFERENCE TO RELATED APPLICATIONS

This application is based on and claims priority under 35 USC 119 from Japanese Patent Application No. 2011-225044 filed on Oct. 12, 2011.

BACKGROUND

1. Technical Field

The present invention relates to a resin composition and a resin molded article.

2. Related Art

As a resin composition, various ones have been provided in the related art and employed in a variety of applications. In particular, they have been used, for example, in various parts, a chassis, or the like of home appliances or automobiles, or in parts of a chassis or the like in office instruments or electronic or electric instruments.

SUMMARY

According to an aspect of the invention, there is provided a resin composition containing (A) a polylactic acid, (B) a polyhydroxyalkanoate, (C) an ammonium polyphosphate, and (D) a phenol-modified epoxy compound, wherein the polylactic acid (A) and the polyhydroxyalkanoate (B) are contained in an amount of from about 60% by mass to about 95% by mass with respect to the total amount of the resin composition; the ammonium polyphosphate (C) is contained in an amount of from about 4% by mass to about 35% by mass with respect to the total amount of the resin composition; the phenol-modified epoxy compound (D) is contained in an amount of from about 1% by mass to about 5% by mass with respect to the total amount of the resin composition; the polylactic acid (A) is contained in an amount of from about 40% by mass to about 90% by mass with respect to the total amount of the resin composition; the polyhydroxyalkanoate (B) is contained in an amount of from about 5% by mass to about 55% by mass with respect to the total amount of the resin composition; and the amount ratio of the polylactic acid (A) to the polyhydroxyalkanoate (B) is from about 0.7 to about 18.

BRIEF DESCRIPTION OF THE DRAWINGS

Exemplary embodiment(s) of the present invention will be described in detail based on the following FIGURE, wherein:

FIG. 1 is a schematic view showing one example of parts of electronic or electric instruments including the resin molded article according to the present exemplary embodiment.

DETAILED DESCRIPTION

Hereinafter, an exemplary embodiment illustrating one example of the resin composition and the resin molded article of the present invention will be described.

[Resin Composition]

The resin composition according to the present exemplary embodiment includes the polylactic acid (A) and the polyhydroxyalkanoate (B) which are contained in an amount of from 60% by mass to 95% by mass (or from about 60% by mass to about 95% by mass) with respect to the total amount of the resin composition, the ammonium polyphosphate (C) which is contained in an amount of from 4% by mass to 35% by mass (or from about 4% by mass to about 35% by mass) with respect to the total amount of the resin composition, and the phenol-modified epoxy compound (D) which is contained in an amount of from 1% by mass to 5% by mass (or from about 1% by mass to about 5% by mass) with respect to the total amount of the resin composition.

Furthermore, the polylactic acid (A) is contained in an amount of from 40% by mass to 90% by mass (or from about 40% by mass to about 90% by mass) with respect to the total amount of the resin composition, the polyhydroxyalkanoate (B) is contained in an amount of from 5% by mass to 55% by mass (or from about 5% by mass to about 55% by mass) with respect to the total amount of the resin composition, and the amount ratio of the polylactic acid (A) to the polyhydroxyalkanoate (B) is from 0.7 to 18 (or from about 0.7 to about 18).

In the resin composition according to the present exemplary embodiment, the hydrolysis resistance is accomplished with the composition above.

Although the reason is not clear, it can be assumed as follows.

As a resin component of a resin composition derived from plants, a polylactic acid and a polyhydroxyalkanoate are both known in the related art.

Furthermore, it is also known that each of the polylactic acid and the polyhydroxyalkanoate lacks hydrolysis resistance on its own.

Incidentally, when the polylactic acid and the polyhydroxyalkanoate are mixed at the above-described amounts, the hydrolysis resistance is exhibited. The reason why the hydrolysis resistance is exhibited is assumed as follows. Since the polylactic acid and the polyhydroxyalkanoate have similar structures, particularly, the aliphatic ester site becomes hydrophilic, thereby forming a Pseudo-IPN (Inter Polymer Network) structure. That is, it is thought that when the Pseudo-IPN structure is formed, high-density bonds are generated in both molecules, and accordingly, the denseness of the IPN structure makes it difficult for the hydroxyl groups positioned at terminals to be attacked by environmental water, leading to improved hydrolysis resistance.

Moreover, it is thought that when an ammonium polyphosphate is present in the composition of the polylactic acid and the polyhydroxyalkanoate, moisture in the atmosphere is selectively absorbed into the ammonium polyphosphate, and thus, the effect (that is, water absorption) on the polylactic acid and the polyhydroxyalkanoate is reduced.

It is further thought that when a phenol-modified epoxy compound is present in combination with ammonium polyphosphate, ammonium polyphosphate, and the polar groups of the polylactic acid and the polyhydroxyalkanoate undergo a chemical reaction or form an ionic bond with the phenol-modified epoxy compound, and the affinity of the ammonium polyphosphate for the polylactic acid and the polyhydroxyalkanoate is easily enhanced.

Accordingly, it is thought that the dispersibility of the ammonium polyphosphate in the resin composition increases, and thus, such a selective water absorption action of the ammonium polyphosphate increases.

As described above, in the resin composition according to the present exemplary embodiment, the hydrolysis resistance is accomplished with the composition including the polylactic acid and the polyhydroxyalkanoate.

As a result, with the resin composition according to the present exemplary embodiment, a resin molded article, in which hydrolysis resistance is accomplished, may be obtained with a composition of the polylactic acid and the polyhydroxyalkanoate.

In addition, although it is known that each of the polylactic acid and the polyhydroxyalkanoate lacks heat resistance individually, it is thought that with the resin composition according to the present exemplary embodiment as described above, when a pseudo-IPN structure is formed in both of them, high-density bonds are generated between both molecules, and thus, improvement of heat resistance is also accomplished.

As a result, with the resin composition according to the present exemplary embodiment, a resin molded article, in which heat resistance is accomplished, may be obtained with a composition of the polylactic acid and the polyhydroxyalkanoate.

Hereinafter, the respective components of the resin composition according to the present exemplary embodiment will be described.

Furthermore, in the present exemplary embodiment, the total amount of the polylactic acid and the polyhydroxyalkanoate is from 60% by mass to 95% by mass with respect to the total amount of the resin composition, and the amount ratio (mass ratio) of the polylactic acid to the polyhydroxyalkanoate is from 0.7 to 18.

(Polylactic Acid)

The polylactic acid, which is derived from plants, has an effect of reducing an environmental load, specifically reducing the amount of $CO_2$ discharged and the amount of petroleum used.

The polylactic acid is not particularly limited as long as it is a condensate of lactic acid, and it may be, for example, L-lactic acid or D-lactic acid, and may be a mixture formed by copolymerization or blending thereof.

As the polylactic acid, for example, a synthesized one or a commercially available one may be used. Examples of the commercially available one include TERRAMAC TE4000, TE7000, and TE8000, all manufactured by Unitika Ltd., and LACEA H100 manufactured by Mitsui Chemicals Inc.

The polylactic acid may be used alone or in combination of two or more kinds thereof.

Moreover, the polylactic acid may be, for example, a copolymer of lactic acid monomers with other monomers. Examples of such other monomers that may be copolymerized with the lactic acid monomers include dicarboxylic acids such as malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, 2,5-norbornanedicarboxylic acid, and ester-forming derivatives thereof, and diols such as ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, 2,2-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, tetraethylene glycol, and di-, tri-, and tetrapropylene glycol. These other monomers may be used alone or in combination of two or more kinds thereof.

The weight-average molecular weight of the polylactic acid is, for example, from 30,000 to 260,000 (or from about 30,000 to about 260,000), and preferably from 40,000 to 150,000.

By setting the weight-average molecular weight of the polylactic acid in the above-described ranges, the hydrolysis resistance of the resin composition is easily improved.

Particularly, by setting the weight-average molecular weight of the polylactic acid to 30,000 or more, the heat resistance of the resin composition is easily improved.

On the other hand, by setting the weight-average molecular weight of the polylactic acid to 260,000 or less, an IPN structure is easily formed and both of the heat resistance and the hydrolysis resistance are easily improved.

In addition, the weight-average molecular weight is a value measured by using a gel permeation chromatography apparatus (Prominence GPC type, manufactured by Shimadzu Corporation), and using Shim-pack GPC-80M as a measurement column. The same shall apply hereinafter.

The polylactic acid is contained in an amount of from 40% by mass to 90% by mass, and preferably from 50% by mass to 80% by mass, with respect to the total amount of the resin composition.

Herein, the amount of the polylactic acid is such that the mass ratio of the polylactic acid to the polyhydroxyalkanoate (polylactic acid/polyhydroxyalkanoate) is from 0.7 to 18, or may be from 40/55 to 90/5, and preferably from 50/60 to 80/30.

By setting the amount of the polylactic acid to 40% by mass or more, the heat resistance of the resin composition is accomplished.

By setting the amount of the polylactic acid to 90% by mass or less, the hydrolysis resistance of the resin composition is accomplished.

(Polyhydroxyalkanoate)

The polyhydroxyalkanoate is not particularly limited as long as it is a polymer of hydroxyalkanoate, but examples thereof include polyhydroxybutyrate, polyhydroxyhexanoate, polyhydroxyvalerate, polyhydroxyoctylate, and a copolymer of two or more kinds thereof.

Among these, from the viewpoints that the ability of forming an IPN structure with the polylactic acid is superior and the hydrolysis resistance and heat resistance are improved, the polyhydroxyalkanoate is a copolymer of polyhydroxybutyrate and polyhydroxyhexanoate.

The polyhydroxyalkanoate may be used alone or in combination of two or more kinds thereof.

The weight-average molecular weight of the polyhydroxyalkanoate is, for example, from 10,000 to 450,000 (or from about 10,000 to about 450,000), and preferably from 50,000 to 200,000.

By setting the weight-average molecular weight of the polyhydroxyalkanoate to the above-described range, the hydrolysis resistance is easily improved.

Particularly, by setting the weight-average molecular weight of the polyhydroxyalkanoate to 10,000 or more, the heat resistance of the resin composition is easily improved.

On the other hand, by setting the weight-average molecular weight of the polylactic acid to 450,000 or less, an IPN structure is easily formed and both of the heat resistance and the hydrolysis resistance are easily improved.

The polyhydroxyalkanoate is contained in an amount of from 5% by mass to 55% by mass, and preferably from 30% by mass to 50% by mass, with respect to the total amount of the resin composition.

By setting the amount of the polyhydroxyalkanoate to 5% by mass or more, the hydrolysis resistance of the resin composition is accomplished.

On the other hand, by setting the amount of the polyhydroxyalkanoate to 55% by mass or less, the heat resistance of the resin composition is accomplished.

(Ammonium Polyphosphate)

The ammonium polyphosphate is not particularly limited as long as it is a polymer of ammonium phosphate.

The weight-average molecular weight of the ammonium polyphosphate is not particularly limited, but it is, for example, from 300 to 10000, and preferably from 1000 to 5000.

The ammonium polyphosphate is contained in an amount of, for example, preferably from 4% by mass to 35% by mass, and more preferably from 8% by mass to 20% by mass, with respect to the total amount of the resin composition.

By setting the amount of the ammonium polyphosphate to 4% by mass or more, the hydrolysis resistance of the resin composition is easily improved.

On the other hand, by setting the amount of the ammonium polyphosphate to 35% by mass or less, the Charpy impact strength is easily improved.

(Phenol-Modified Epoxy Compound)

The phenol-modified epoxy compound is a compound in which a hydrogen atom of an aromatic ring of phenol is substituted with an epoxy group.

Examples of the phenol-modified epoxy compound include phenol-modified monoepoxy compounds (compounds in which one hydrogen atom of an aromatic ring of phenol is substituted with an epoxy group: for example, 2-epoxyphenol, 4-epoxyphenol, 2,6-dihydroxymethyl-4-epoxyphenol, and bis(3-formyl-4-hydroxyphenyl)-epoxymethane), and phenol-modified diepoxy compounds (compounds in which two hydrogen atoms of an aromatic ring of phenol are substituted with epoxy groups: for example, phenol-modified compounds having one epoxy group, for example, 2,5-diepoxyphenol, 2,6-dihydroxymethyl-4,5-epoxyphenol, and bis(3-formyl-4-hydroxyphenyl)-diepoxymethane).

Among these, from the viewpoint of improving the dispersibility of the ammonium polyphosphate (that is, from the viewpoint of improving the hydrolysis resistance of the resin composition), the phenol-modified epoxy compound is preferably a phenol-modified diepoxy compound.

The phenol-modified epoxy compound is contained in amount of, for example, preferably from 1% by mass to 5% by mass, and more preferably from 2% by mass to 4% by mass, with respect to the total amount of the resin composition.

By setting the amount of the phenol-modified epoxy compound to 1% by mass or more, the hydrolysis resistance of the resin composition is easily improved.

On the other hand, by setting the amount of the phenol-modified epoxy compound to 4% by mass or less, reduction in the Charpy impact strength is easily suppressed.

(Other Components)

The resin composition according to the present exemplary embodiment may further include other components, if desired.

Examples of such other components include a flame retardant, a compatibilizing agent, a plasticizer, an antioxidant, a release agent, a light-fastness agent, a weathering agent, a colorant, a pigment, a modifier, an anti-dripping agent, an antistatic agent, an anti-hydrolysis agent, fillers, and a reinforcing agent (glass fiber, carbon fiber, talc, clay, mica, glass flakes, milled glass, glass beads, crystalline silica, alumina, silicon nitride, alumina nitride, boron nitride, and the like).

The amount of such other components is, for example, from 0% by mass to 10% by mass, and preferably from 0% by mass to 5% by mass, with respect to the total amount of the resin composition. Herein, "0% by mass" means that other components are not included.

(Method for Preparing Resin Composition)

The resin composition according to the present exemplary embodiment is prepared by melt-kneading a mixture of the respective components.

Herein, examples of a unit for melt-kneading include known units, for example, a bi-axial extruder, a Henschel mixer, a Banbury mixer, a mono-axial screw extruder, a multi-axial screw extruder, and a co-kneader.

[Resin Molded Article]

The resin molded article according to the present exemplary embodiment includes the resin composition according to the present exemplary embodiment. That is, the resin molded article according to the present exemplary embodiment is composed of the same composition as that of the resin composition according to the present exemplary embodiment.

Specifically, the resin molded article according to the present exemplary embodiment may be obtained, for example, by subjecting the resin composition according to the present exemplary embodiment to injection molding.

Further, the molding method is not limited to injection molding, and other molding methods (for example, molding methods such as extrusion molding, blow molding, hot-press molding, calendar molding, coating molding, cast molding, dipping molding, vacuum forming, and transfer molding) may be applied.

Herein, the injection molding may also be carried out, for example, using a commercially available apparatus, such as a NEX150 manufactured by Nissei Plastic Industrial Co., Ltd., a NEX70000 manufactured by Nissei Plastic Industrial Co., Ltd., and an SE50D manufactured by Toshiba Machine Co., Ltd.

Herein, the cylinder temperature is preferably from 170° C. to 280° C., and more preferably from 180° C. to 270° C. Further, the mold temperature is preferably from 40° C. to 110° C., and more preferably from 50° C. to 110° C.

The resin molded article according to the present exemplary embodiment is suitable for applications to electronic or electric instruments, home appliances, containers, automotive interiors, and the like. More specifically, the resin molded article is suitable for a chassis and various parts of home appliances, electronic or electric instruments, or the like, wrapping films, cases for storing CD-ROMs, DVDs, or the like, eating utensils, food trays, drink bottles, drug packaging materials, and the like, and among these, it is suitable for the parts of electronic or electric instruments.

FIG. 1 is a perspective view seen from the front side of an image forming apparatus which is one example of a part of electronic or electric instruments including the resin molded article according to the present exemplary embodiment.

The image forming apparatus 100 of FIG. 1 includes front covers 120a and 120b on the front side of a main unit 110. The front covers 120a and 120b are openable to allow an operator to perform operations inside the apparatus. By this, the operator performs, for example, replenishment of a toner when the toner is consumed, replacement of a consumed process cartridge, or removal of clogged paper when a paper jam occurs in the apparatus. FIG. 1 illustrates the apparatus with the front covers 120a and 120b opened.

The main unit 110 has, on the upper side thereof, an operation panel 130 in which all the conditions related to image formation, such as a paper size and a number of copies, are input by an operator, and a copy glass 132 on which a document to be read is placed. Further, the main unit 110 includes an automatic document transporter 134 that transports a document onto the copy glass 132. The main unit 110 has an image reading unit that scans a document image placed on the copy glass 132 to obtain image data which displays the document image. The image data obtained by the image reading unit is sent to an image forming unit via a controlling unit. The image reading unit and the controlling unit are mounted in a chassis 150 that constitutes a part of the main unit 110. The image forming unit is a detachable process cartridge 142, which is also mounted inside the chassis 150. The process cartridge 142 is attached or detached by turning a latch lever 144.

A toner container 146 is fitted into the chassis 150 of the main unit 110. The toner container 146 has a toner supply port 148, through which it is replenished with toner. The toner contained in the toner container 146 is fed to a developing unit.

On the other hand, the main unit 110 has, in the lower part thereof, paper containing cassettes 140*a*, 140*b*, and 140*c*. The main unit 110 has plural pairs of transport rolls arranged therein to form a transport path, through which the paper from a paper containing cassette transports to the upper image forming unit. Further, the sheets of paper in each of the paper containing cassettes are discharged and sent one by one to the transport path by a paper discharge mechanism that is disposed near the end of the transport path. A manual paper feed unit 136 is provided on a side of the main unit 110, through which paper is also fed.

Sheets of paper having an image formed thereon in the image forming unit are sequentially transported to between two fixing rolls kept in contact with each other and supported by a chassis 152 that constitutes a part of the main unit 110 and discharged to the outside of the main unit 110. The main unit 110 includes plural paper discharge units 138 on the side opposite to the side on which the paper feed unit 136 is placed, and thus, the paper after forming an image is discharged to the paper discharge units.

In the image forming apparatus 100, the resin molded article according to the present exemplary embodiment is used in, for example, the front covers 120*a* and 120*b*, the casing of the process cartridge 142, and the chassis 150 and 152.

EXAMPLES

Hereinbelow, the present invention will be described in detail with reference to Examples, but the present invention is not limited to these Examples. Further, the "parts" are hereinafter based on the mass unless otherwise specially noted.

Examples 1 to 19 and Comparative Examples 1 to 9

The materials are kneaded in a compositional ratio (the numerical values in Table 1 or 2 are % by mass) shown in Table 1 or 2 by means of a bi-axial kneader (TEM3000, manufactured by Toshiba Machine Co., Ltd.) at a cylinder temperature of the kneading conditions shown in Table 3, thereby obtaining a pellet of the resin composition.

Next, this pellet is subjected to injection molding using an injection molding machine (NEX80, manufactured by Nissei Plastic Industrial Co., Ltd.) at a cylinder temperature and a mold temperature of the molding conditions shown in Table 2, thereby obtaining an ISO multi-purpose dumbbell specimen (a dumbbell specimen having a width of 10 mm, a thickness of 4 mm, and a length of 80 mm, corresponding to an ISO 527 tensile test and an ISO 178 bending test).

(Evaluation)

In each of the examples, the obtained molded articles (ISO multi-purpose dumbbell specimens) are evaluated as follows. The results are shown in Table 3.

—Hydrolysis Resistance—

The ISO multi-purpose dumbbell specimens are processed in accordance with the method of ISO 179, thereby obtaining a measurement specimen for a notched Charpy impact strength.

Furthermore, the measurement specimen is exposed to an environment of 60° C./85% RH, and the values of the Charpy impact strength before the exposure and after the exposure at 500 hours and 1000 hours are measured and evaluated as hydrolysis resistance.

In addition, the Charpy impact strength is measured in an impact test apparatus (DG-5, manufactured by Toyo Seiki Co., Ltd.) in accordance with ISO 179.

—Heat Resistance—

Using the obtained ISO multi-purpose dumbbell specimens, a load deflection temperature at 1.8 MPa is measured with an HDT measurement apparatus (HDT6, manufactured by Toyo Seiki Co., Ltd.) in accordance with the method of ISO 75, and the heat resistance is evaluated.

TABLE 1

| | Polylactic acid | | | | Polyhydroxyalkanoate PHBH | | | |
|---|---|---|---|---|---|---|---|---|
| | TERRAMAC TE2000 Mw 120000 | 3051D Mw 80000 | 3251D Mw 25000 | 4032D Mw 220000 | Synthesized product 1 Mw 250000 | Synthesized product 2 Mw 50000 | Synthesized product 3 Mw 8000 | Synthesized product 4 Mw 480000 |
| Ex. 1 | 40 | | | | 40 | | | |
| Ex. 2 | 90 | | | | 5 | | | |
| Ex. 3 | 55 | | | | 30 | | | |
| Ex. 4 | 70 | | | | 10 | | | |
| Ex. 5 | 40 | | | | 55 | | | |
| Ex. 6 | | 55 | | | 30 | | | |
| Ex. 7 | | | 55 | | 30 | | | |
| Ex. 8 | | | | 55 | 30 | | | |
| Ex. 9 | 55 | | | | | 30 | | |
| Ex. 10 | 55 | | | | | | 30 | |
| Ex. 11 | 55 | | | | | | | 30 |
| Ex. 12 | 55 | | | | | | | |
| Ex. 13 | 55 | | | | | | | |
| Ex. 14 | 40 | | | | 28 | | | |
| Ex. 15 | 60 | | | | 30 | | | |
| Ex. 16 | 55 | | | | 30 | | | |
| Ex. 17 | 55 | | | | 30 | | | |

TABLE 1-continued

| | | | |
|---|---|---|---|
| Ex. 18 | 55 | | 30 |
| Ex. 19 | 55 | | 30 |

| | Polyhydroxyalkanoate | | Polylactic acid/ polyhydroxy alkanoate | Ammonium polyphosphate | | Epoxy compound | |
|---|---|---|---|---|---|---|---|
| | PHB BIOPOL 30 Mw 40000 | PHBV Synthesized product 5 Mw 85000 | | EXOLIT AP422 | TERRAJU C80 | Epikote 828 | N-740 |
| Ex. 1 | | | 1 | 15 | | 5 | |
| Ex. 2 | | | 18 | 4 | | 1 | |
| Ex. 3 | | | 1.8 | 14 | | 1 | |
| Ex. 4 | | | 7 | 18 | | 2 | |
| Ex. 5 | | | 0.7 | 4 | | 1 | |
| Ex. 6 | | | 1.8 | 14 | | 1 | |
| Ex. 7 | | | 1.8 | 14 | | 1 | |
| Ex. 8 | | | 1.8 | 14 | | 1 | |
| Ex. 9 | | | 1.8 | 14 | | 1 | |
| Ex. 10 | | | 1.8 | 14 | | 1 | |
| Ex. 11 | | | 1.8 | 14 | | 1 | |
| Ex. 12 | 30 | | 1.8 | 14 | | 1 | |
| Ex. 13 | | 30 | 1.8 | 14 | | 1 | |
| Ex. 14 | | | 1.4 | 30 | | 2 | |
| Ex. 15 | | | 2 | 8 | | 2 | |
| Ex. 16 | | | 1.8 | | 14 | 1 | |
| Ex. 17 | | | 1.8 | 14 | | | 1 |
| Ex. 18 | | | 1.8 | | 14 | | 1 |
| Ex. 19 | | | 1.8 | 10 | | 5 | |

TABLE 2

| | Polylactic acid | | | | Polyhydroxyalkanoate PHBH | | | |
|---|---|---|---|---|---|---|---|---|
| | TERRAMAC TE2000 Mw 120000 | 3051D Mw 80000 | 3251D Mw 25000 | 4032D Mw 220000 | Synthesized product 1 Mw 250000 | Synthesized product 2 Mw 50000 | Synthesized product 3 Mw 8000 | Synthesized product 4 Mw 480000 |
| Comp. Ex. 1 | 100 | | | | | | | |
| Comp. Ex. 2 | | | | | | 100 | | |
| Comp. Ex. 3 | 35 | | | | | 50 | | |
| Comp. Ex. 4 | 95 | | | | | 2 | | |
| Comp. Ex. 5 | 20 | | | | | 65 | | |
| Comp. Ex. 6 | 60 | | | | | 40 | | |
| Comp. Ex. 7 | 40 | | | | | 60 | | |
| Comp. Ex. 8 | 90 | | | | | 10 | | |
| Comp. Ex. 9 | 35 | | | | | 60 | | |

| | Polyhydroxyalkanoate | | Polylactic acid/ Polyhydroxy alkanoate | Ammonium polyphosphate | | Epoxy compound | |
|---|---|---|---|---|---|---|---|
| | PHB BIOPOL 30 Mw 40000 | PHBV Synthesized product 5 Mw 85000 | | EXOLIT AP422 | TERRAJU C80 | Epikote 828 | N-740 |
| Comp. Ex. 1 | | | — | | | | |
| Comp. Ex. 2 | | | 0 | | | | |
| Comp. Ex. 3 | | | 0.7 | 14 | | 1 | |
| Comp. Ex. 4 | | | 47.5 | 2 | | 1 | |
| Comp. Ex. 5 | | | 0.3 | 14 | | 1 | |
| Comp. Ex. 6 | | | 1.5 | | | | |
| Comp. Ex. 7 | | | 0.7 | | | | |
| Comp. Ex. 8 | | | 9 | | | | |
| Comp. Ex. 9 | | | 0.6 | 4 | | 1 | |

TABLE 3

| | Kneading conditions | Molding conditions | | Hydrolysis resistance Charpy impact strength (kJ/m$^2$) | | | Heat resistance 1.8 Mpa Load |
|---|---|---|---|---|---|---|---|
| | Cylinder temperature (°C.) | Cylinder temperature (°C.) | Mold temperature (°C.) | 60° C./85% RH Exposure time 0 hr | 60° C./85% RH Exposure time 500 hrs | 60° C./85% RH Exposure time 1000 hrs | deflection temperature (°C.) |
| Ex. 1 | 160 | 155 | 60 | 6.5 | 6.5 | 6.5 | 65 |
| Ex. 2 | 180 | 170 | 60 | 4.2 | 4.1 | 3.9 | 66 |
| Ex. 3 | 165 | 160 | 60 | 7.3 | 7.3 | 7.3 | 70 |
| Ex. 4 | 170 | 165 | 60 | 5.8 | 5.8 | 5.7 | 66 |
| Ex. 5 | 155 | 150 | 60 | 7.9 | 7.9 | 7.8 | 62 |
| Ex. 6 | 165 | 160 | 60 | 7.4 | 7.4 | 7.4 | 68 |
| Ex. 7 | 165 | 160 | 60 | 7.3 | 7.1 | 6.8 | 68 |
| Ex. 8 | 170 | 165 | 60 | 7.3 | 6.9 | 6.6 | 70 |
| Ex. 9 | 160 | 155 | 60 | 7.4 | 7.4 | 7.4 | 68 |
| Ex. 10 | 165 | 160 | 60 | 7.2 | 6.9 | 6.7 | 65 |
| Ex. 11 | 165 | 160 | 60 | 7.5 | 7.2 | 6.9 | 65 |
| Ex. 12 | 165 | 160 | 60 | 6.8 | 6.6 | 6.5 | 65 |
| Ex. 13 | 170 | 160 | 60 | 6.9 | 6.9 | 6.7 | 66 |
| Ex. 14 | 165 | 160 | 60 | 4.8 | 4.7 | 4.6 | 72 |
| Ex. 15 | 165 | 160 | 60 | 6.8 | 6.6 | 6.6 | 65 |
| Ex. 16 | 165 | 160 | 60 | 6.7 | 6.6 | 6.5 | 66 |
| Ex. 17 | 165 | 160 | 60 | 6.9 | 6.8 | 6.8 | 65 |
| Ex. 18 | 165 | 160 | 60 | 6.9 | 6.9 | 6.8 | 66 |
| Ex. 19 | 165 | 160 | 60 | 7.1 | 7.1 | 7 | 72 |
| Comp. Ex. 1 | Not kneaded | 180 | 40 | 1.7 | 0.4 | 0.1 | 58 |
| Comp. Ex. 2 | Not kneaded | 145 | 60 | 3.8 | 3.2 | 2.4 | 39 |
| Comp. Ex. 3 | 160 | 155 | 60 | 2.5 | 1.9 | 0.9 | 43 |
| Comp. Ex. 4 | 180 | 170 | 60 | 2.8 | 2.2 | 0.9 | 54 |
| Comp. Ex. 5 | 160 | 155 | 60 | 4.0 | 3.5 | 2.9 | 49 |
| Comp. Ex. 6 | 170 | 160 | 60 | 2.2 | 1.4 | 0.6 | 52 |
| Comp. Ex. 7 | 165 | 160 | 60 | 3.7 | 3.1 | 2.1 | 51 |
| Comp. Ex. 8 | 175 | 165 | 60 | 1.9 | 0.9 | 0.2 | 55 |
| Comp. Ex. 9 | 160 | 155 | 60 | 3.5 | 3.2 | 2.2 | 50 |

From the results above, it can be seen that in the present Examples, the hydrolysis resistance and the heat resistance are both good, as compared with Comparative Examples.

Details on the materials in the respective Tables are shown below.

(Polylactic Acid)

"TERRAMAC TE2000" manufactured by Unitika Ltd., (weight-average molecular weight Mw=120,000)

"3051D" manufactured by Natureworks Co., Ltd., (weight-average molecular weight Mw=80,000)

"3251D" manufactured by Natureworks Co., Ltd., (weight-average molecular weight Mw=25,000)

"4032D" manufactured by Natureworks Co., Ltd., (weight-average molecular weight Mw=220,000)

(Polyhydroxyalkanoate)

—PHBH (copolymer of poly-3-hydroxybutyrate and poly-3-hydroxyhexanoate)—

Synthesized product 1: Synthesized product obtained by the following synthesis method (weight-average molecular weight Mw=250,000)

A cyclic hydroxybutyrate dimer and a cyclic hydroxyhexanoate dimer are dissolved at a molar ratio of 89/11 in chloroform, and 0.1 part by mass of tin oxide with respect to 100 parts by mass of the total compound is added thereto, and the mixture is stirred at 40° C. for 200 hours. The obtained polymer compound is reprecipitated in water. The filtrate is stirred at 160° C. for 1 hour to obtain a synthesized product 1 (PHBH) having a desired molecular weight.

Synthesized product 2: Synthesized product obtained by the following synthesis method (weight-average molecular weight Mw=50,000)

In the same manner as for the synthesized product 1 except that the filtrate is stirred at 170° C. for 1 hour, a synthesized product 2 is obtained.

Synthesized product 3: Synthesized product obtained by the following synthesis method (weight-average molecular weight Mw=8,000)

In the same manner as for the synthesized product 1 except that the filtrate is stirred at 170° C. for 2.5 hours, a synthesized product 3 is obtained.

Synthesized product 4: Synthesized product obtained by the following synthesis method (weight-average molecular weight Mw=480,000)

In the same manner as for the synthesized product 1 except that the filtrate is stirred at 150° C. for 20 minutes, a synthesized product 4 is obtained.

—PHB (poly-3-hydroxybutyrate)—

Polyhydroxybutyrate: "BIOPOL 30" manufactured by Japan Monsanto Company (weight-average molecular weight Mw=40,000)

—PHBV (copolymer of poly-3-hydroxybutyrate and poly-3-hydroxyvalerate)—

Synthesized product 5: Synthesized product obtained by the following synthesis method (weight-average molecular weight Mw=85,000)

A cyclic hydroxybutyrate dimer and a cyclic hydroxyvalerate dimer are dissolved at a molar ratio of 89/11 in chloroform, and 0.1 part by mass of tin oxide with respect to 100 parts by mass of the total compound is added thereto, and the mixture is stirred at 40° C. for 200 hours. The obtained polymer compound is reprecipitated in water. The filtrate is stirred at 150° C. for 10 minutes to obtain a synthesized product 5 (PHBV) having a desired molecular weight.

(Ammonium Polyphosphate)

"EXOLIT AP422" manufactured by Clariant

"TERRAJU C80" manufactured by Budenheim Iberica Commercial, S.A.

(Phenol-Modified Epoxy Compound)

"EPIKOTE 828" manufactured by Japan Epoxy Resin Co., Ltd. (bisphenol A type diepoxy compound)

"N-740" manufactured by DIC Corporation (novolac type epoxy compound)

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   (A) a polylactic acid,
   (B) a polyhydroxyalkanoate,
   (C) an ammonium polyphosphate, and
   (D) a phenol-modified epoxy compound,
   wherein the polylactic acid (A) and the polyhydroxyalkanoate (B) are contained in an amount of from about 60% by mass to about 95% by mass with respect to the total amount of the resin composition;
   the ammonium polyphosphate (C) is contained in an amount of from about 4% by mass to about 35% by mass with respect to the total amount of the resin composition;
   the phenol-modified epoxy compound (D) is contained in an amount of from about 1% by mass to about 5% by mass with respect to the total amount of the resin composition;
   the polylactic acid (A) is contained in an amount of from about 40% by mass to about 90% by mass with respect to the total amount of the resin composition;
   the polyhydroxyalkanoate (B) is contained in an amount of from about 5% by mass to about 55% by mass with respect to the total amount of the resin composition; and
   the amount ratio of the polylactic acid (A) to the polyhydroxyalkanoate (B) is from about 0.7 to about 18.

2. The resin composition according to claim 1, wherein the polyhydroxyalkanoate is a copolymer of polyhydroxybutyrate and polyhydroxyhexanoate.

3. The resin composition according to claim 1, wherein the weight-average molecular weight of the polylactic acid is from about 30,000 to about 260,000.

4. The resin composition according to claim 2, wherein the weight-average molecular weight of the polylactic acid is from about 30,000 to about 260,000.

5. The resin composition according to claim 1, wherein the weight-average molecular weight of the polyhydroxyalkanoate is from about 10,000 to about 450,000.

6. The resin composition according to claim 2, wherein the weight-average molecular weight of the polyhydroxyalkanoate is from about 10,000 to about 450,000.

7. The resin composition according to claim 3, wherein the weight-average molecular weight of the polyhydroxyalkanoate is from about 10,000 to about 450,000.

8. The resin composition according to claim 4, wherein the weight-average molecular weight of the polyhydroxyalkanoate is from about 10,000 to about 450,000.

9. A resin molded article comprising:
   (A) a polylactic acid,
   (B) a polyhydroxyalkanoate,
   (C) an ammonium polyphosphate, and
   (D) a phenol-modified epoxy compound,
   wherein the polylactic acid (A) and the polyhydroxyalkanoate (B) are contained in an amount of from about 60% by mass to about 95% by mass with respect to the total amount of the resin molded article;
   the ammonium polyphosphate (C) is contained in an amount of from about 4% by mass to about 35% by mass with respect to the total amount of the resin molded article;
   the phenol-modified epoxy compound (D) is contained in an amount of from about 1% by mass to about 5% by mass with respect to the total amount of the resin molded article;
   the polylactic acid (A) is contained in an amount of from about 40% by mass to about 90% by mass with respect to the total amount of the resin molded article;
   the polyhydroxyalkanoate (B) is contained in an amount of from about 5% by mass to about 55% by mass with respect to the total amount of the resin molded article; and
   the amount ratio of the polylactic acid (A) to the polyhydroxyalkanoate (B) is from about 0.7 to about 18.

10. The resin molded article according to claim 9, wherein the polyhydroxyalkanoate is a copolymer of polyhydroxybutyrate and polyhydroxyhexanoate.

11. The resin molded article according to claim 9, wherein the weight-average molecular weight of the polylactic acid is from about 30,000 to about 260,000.

12. The resin molded article according to claim 10, wherein the weight-average molecular weight of the polylactic acid is from about 30,000 to about 260,000.

13. The resin molded article according to claim 9, wherein the weight-average molecular weight of the polyhydroxyalkanoate is from about 10,000 to about 450,000.

14. The resin molded article according to claim 10, wherein the weight-average molecular weight of the polyhydroxyalkanoate is from about 10,000 to about 450,000.

15. The resin molded article according to claim 11, wherein the weight-average molecular weight of the polyhydroxyalkanoate is from about 10,000 to about 450,000.

16. The resin molded article according to claim 12, wherein the weight-average molecular weight of the polyhydroxyalkanoate is from about 10,000 to about 450,000.

* * * * *